(12) United States Patent
Pease

(10) Patent No.: US 6,422,643 B1
(45) Date of Patent: Jul. 23, 2002

(54) SYSTEM FOR ATTACHING FRONT GRILL OR OTHER TRIM COMPONENT TO VEHICLE

(75) Inventor: Elden Pease, Romeo, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 10/016,684

(22) Filed: Dec. 17, 2001

Related U.S. Application Data

(60) Provisional application No. 60/339,321, filed on Dec. 12, 2001.

(51) Int. Cl.[7] .............................................. B60R 19/52
(52) U.S. Cl. .................... 296/194; 296/29; 293/115; 293/155; 24/297
(58) Field of Search ................................ 296/191, 194, 296/29; 293/115, 154, 155; 24/297, 292

(56) References Cited

U.S. PATENT DOCUMENTS

| | | | | |
|---|---|---|---|---|
| 4,354,566 A | * | 10/1982 | Yuda | 293/115 X |
| 4,593,441 A | * | 6/1986 | St. Louis | 24/297 X |
| 4,645,250 A | * | 2/1987 | Bauer et al. | 293/115 X |
| 4,944,540 A | | 7/1990 | Mansoor et al. | |
| RE34,907 E | | 4/1995 | Gross | |
| 5,503,444 A | * | 4/1996 | Rouse et al. | 293/115 X |
| 5,800,259 A | | 9/1998 | Olney | |
| 5,846,017 A | * | 12/1998 | Meyer | 24/297 |
| 5,865,500 A | * | 2/1999 | Sanada et al. | 293/115 X |
| 5,941,329 A | | 8/1999 | Ichioka et al. | |
| 5,951,094 A | * | 9/1999 | Konishi et al. | 280/751 |
| D431,505 S | | 10/2000 | Kitamura et al. | |
| 6,206,438 B1 | | 3/2001 | Pueyo | |
| D448,329 S | | 9/2001 | Maeda et al. | |
| 6,290,287 B1 | * | 9/2001 | Guyomard | 296/194 X |
| D450,639 S | | 11/2001 | Nakamuta | |

* cited by examiner

Primary Examiner—Joseph D. Pape
Assistant Examiner—Jason Morrow
(74) Attorney, Agent, or Firm—Nixon & Vanderhye P.C.

(57) ABSTRACT

A connection structure is provided for attaching a component (e.g., a front grill or other vehicle component) to a vehicle. The connection structure includes first and second side-by-side prongs or projections which are inserted at least partially into an aperture in a support structure of the vehicle. As the prongs are inserted into the aperture, the prongs are biased in opposite directions until a point in time when the first prong gets far enough into the aperture so that it can latch onto a wall of the aperture. When the first prong latches onto the wall of the aperture in order to prevent the prong (and thus the component) from being pulled out of the aperture, the other or second prong is lodged in the aperture in order to prevent the first prong from being unlatched.

17 Claims, 5 Drawing Sheets

US 6,422,643 B1

SYSTEM FOR ATTACHING FRONT GRILL OR OTHER TRIM COMPONENT TO VEHICLE

This application claims priority on U.S. Provisional Application Serial No. 60/339,321, filed Dec. 12, 2001. This application relates to a system for attaching a front grill or other trim component to a vehicle (e.g., car, truck, sport utility vehicle, or the like). More particular, this invention relates to a connection structure including first and second prongs which extend at least partially through an opening in different respects in order to connect the grill or other trim component to the vehicle.

BACKGROUND OF THE INVENTION

Systems for connecting front grills to vehicles are known in the art. Conventionally, metal clips are often used to attach a front grill to a vehicle's grill opening reinforcement (GOR) structure in front of the vehicle's radiator. As the vehicle is driven, air flowing through the grill reaches the radiator to help cool water and/or anti-freeze fluid therein in a known manner.

Unfortunately, the metal clips are sometimes problematic in the following regards. First, the metal clips often must be put on at the assembly line facility, which requires an extra person(s) at the assembly line facility and/or additional cost. Second, grills attached to vehicles in such a manner are prone to falling off the vehicle and/or rattling during rough operating conditions (e.g., off-road driving, and/or after years of conventional driving).

In view of the above, it will be apparent to the skilled artisan that there exists a need in the art for an improved system (structure and/or method) for attaching grill(s) and/or other trim component(s) to a vehicle(s). It is an object of this invention to fulfill this need and/or other needs which will become apparent to the skilled artisan upon review of this document.

BRIEF SUMMARY OF THE INVENTION

An object of this invention is to provide an improved system (e.g., structure and/or method) for attaching a grill and/or other trim component to a vehicle.

Another object of this invention is to provide a system for attaching a grill and/or other vehicle trim component to a vehicle in an efficient and secure manner.

Another object of this invention is to fulfill one or more of the above-listed objects.

In certain example embodiments of this invention, one or more of the above-listed objects and/or needs is/are fulfilled by providing a connection structure for attaching a front grill to a vehicle via at least one aperture provided in the vehicle, comprising: an integrally molded grill including at least one connection structure including first and second prongs extending from a support in a side-by-side manner; the first and second prongs being shaped differently so that when the first and second prongs are inserted into the aperture the first and second prongs slide along opposite edges of the aperture and are biased in opposite directions; the first prong including a latching step for latching onto a wall at least partially defining the aperture in order to prevent the first prong from being pulled out of the aperture; and when the first prong is latched onto the wall, the second prong is positioned at least partially in the aperture, without being latched onto any wall defining the aperture, in order to prevent the first prong from being unlatched so as to securely connect the grill to the vehicle.

In other example embodiments of this invention, one or more of the above listed objects and/or needs is/are fulfilled by providing a connection structure for attaching a trim component to a vehicle via at least one aperture, comprising: the trim component being integrally molded so as to include first and second prongs extending from a support; means for causing the first and second prongs to slide along opposite edges of the aperture as the prongs are inserted into the aperture; latching means for allowing the first prong to latch onto a wall at least partially defining the aperture in order to prevent the first prong from being pulled out of the aperture; means for causing, when the first prong is latched onto the wall, the second prong to become lodged in the aperture in at least one dimension so as to prevent the first prong from becoming unlatched thereby securely attaching the trim component to the vehicle.

In still further example embodiments of this invention, one or more of the above listed objects and/or needs is/are fulfilled by providing a method of attaching a grill to a vehicle, the method comprising: injection molding a grill so as to include a grill body for allow air flow therethrough and first and second prongs extending in a side-by-side manner from a support; inserting the first and second prongs into an aperture so that during the inserting the first and second prongs slide along opposite edges of the aperture and are biased or forced in opposite directions; and continuing the inserting until the first prong latches onto a wall at least partially defining the aperture and the second prong is positioned at least partially in the aperture, without latching, in a manner so as to prevent the first prong from becoming unlatched during operation of the vehicle.

DETAILED DESCRIPTION OF EXAMPLE EMBODIMENTS OF THE INVENTION

Figure 1:
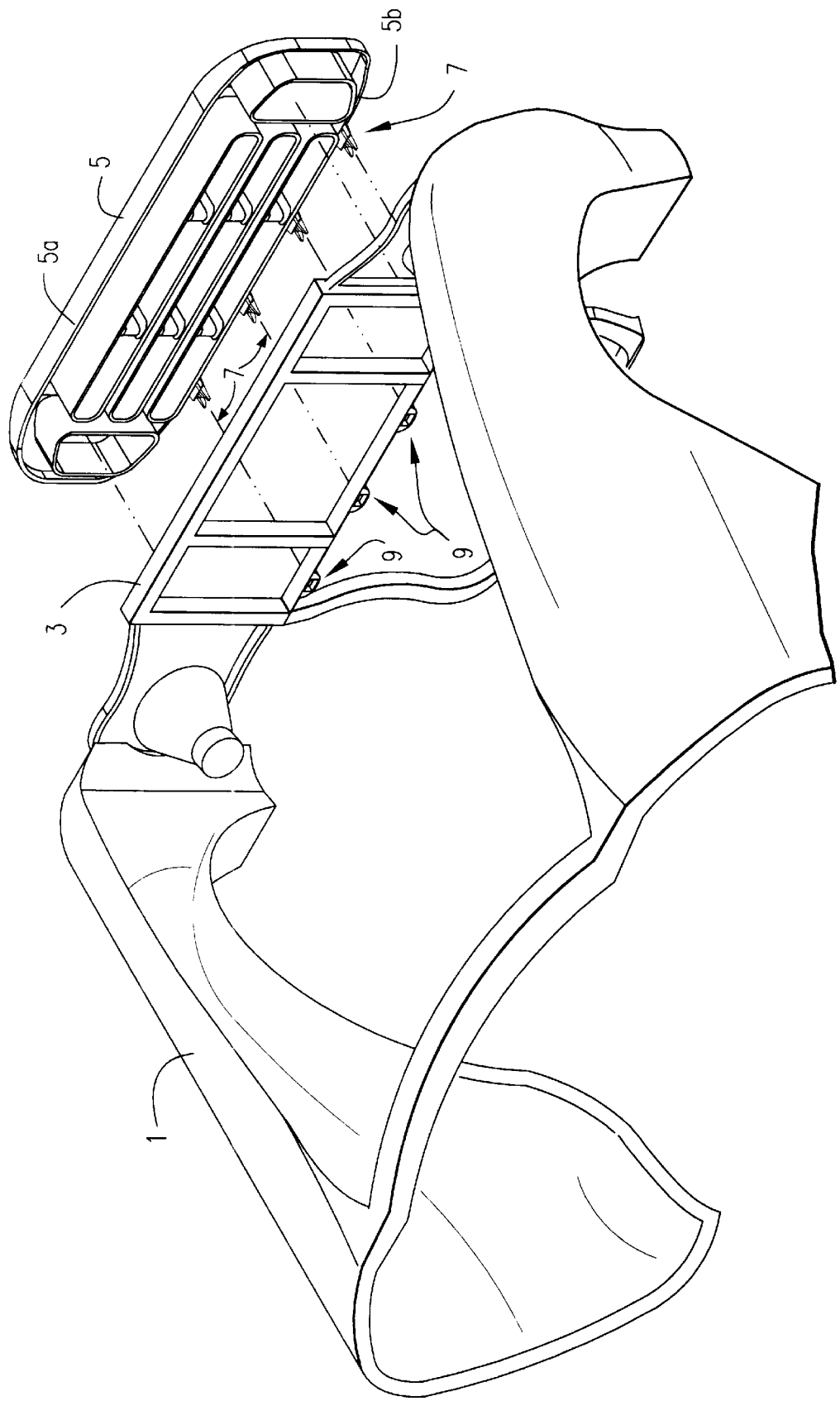
FIG. 1 is an exploded top/side perspective view of a front grill to be attached to a vehicle in accordance with an example embodiment of this invention.

Referring now more particularly to the accompanying drawings in which like reference numerals indicate like parts throughout the several views.

FIG. 1 is a perspective view of a portion of a vehicle, viewed from the top and side, according to an example embodiment of this invention.

The vehicle includes vehicle body 1, grill opening reinforcement (GOR) structure 3 which is provided at a front portion of the vehicle near the radiator, and front grill 5 which is to be attached to the GOR structure 3. The instant invention relates to an improved connection or attachment system for attaching grill 5 to the GOR 3 or any other suitable vehicle support structure. In certain example embodiments of this invention, the attachment system may be used to attach both the top 5a and bottom 5b grill portions to the GOR structure 3, while in alternative embodiments the attachment system herein may be used to attach only one of the top/bottom grill portions to the GOR structure while some other suitable attachment structure (e.g., screws, clips, and/or the like) is used to attach the remainder of the grill to the GOR structure.

In the embodiments described below, for purposes of example only and without limitation unless specifically claimed, the improved connection or attachment system is used to attach the bottom portion 5b of the grill 5 to the GOR structure 3, while screw, clips or the like are used to attach the top portion 5a of the grill 5 to the GOR structure.

In the example embodiment of FIG. 1, four separate spaced apart connection or attachment structures 7 according to an embodiment of this invention are used to attached the bottom portion of the grill 5 to the GOR structure 3. As illustrated, the connection or attachment structures 7 each include a pair of projections or prongs mounted on the grill 5 (e.g., integrally molded with the grill) which at least partially slide into corresponding openings or apertures 9 in the GOR structure 3. In alternative embodiments of this invention, the apertures 9 may be provided in any other suitable vehicle structure (instead of in the GOR structure).

Figure 2:
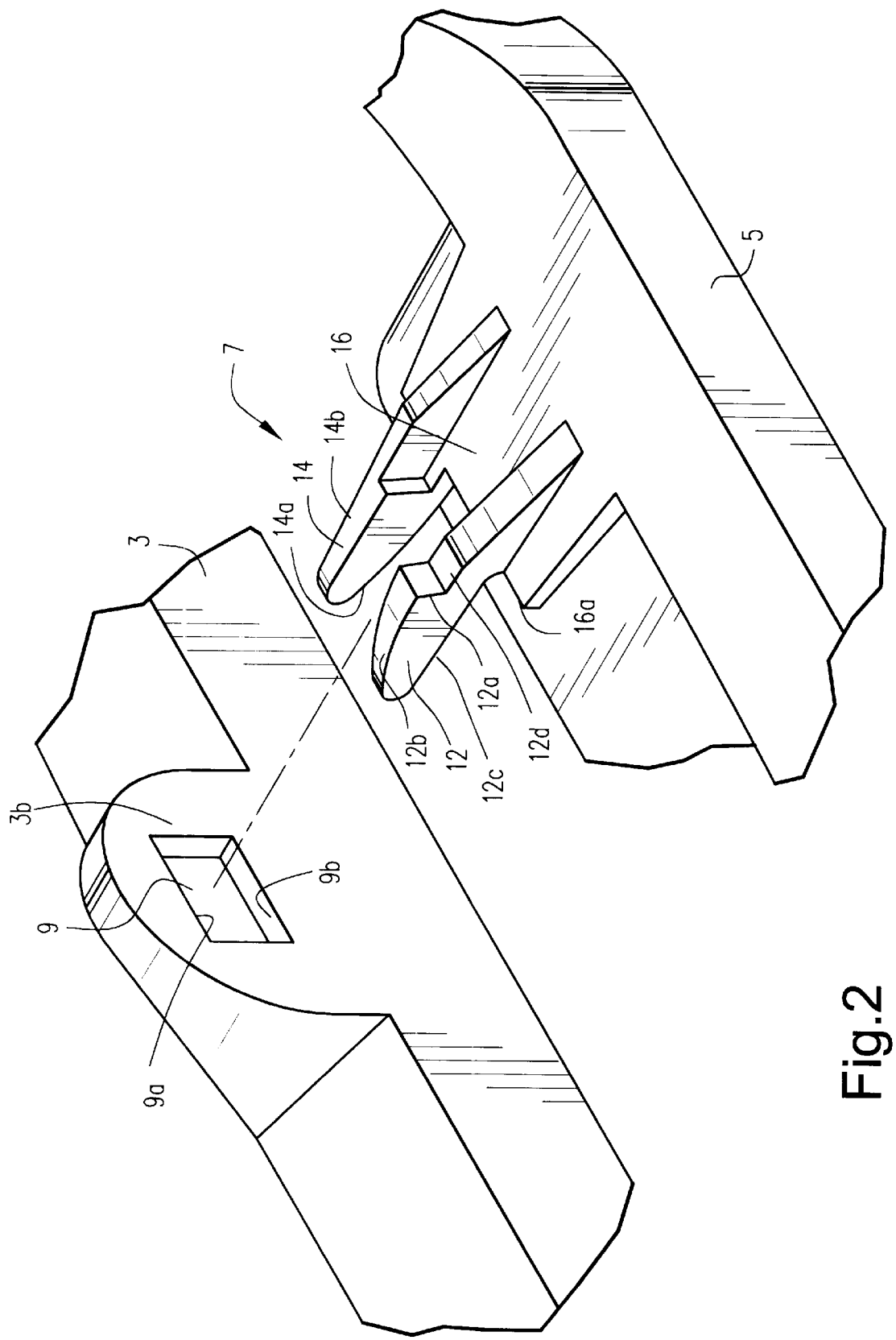
FIG. 2 is an exploded perspective view of one of the connection structures of FIG. 1, as viewed from below.

FIG. 2 is a perspective view of one of the connection or attachment structures 7 of FIG. 1, as viewed from the ground below the vehicle. The connection or attachment structure includes a female portion and a male portion. The female portion includes aperture 9 (e.g., rectangular or any other suitable shape) in GOR structure 3; while the male portion includes first projection (or prong) 12 and second projection (or prong) 14 mounted on (e.g., integrally molded with) the vehicle grill 5 via support 16. In certain example embodiments of this invention, the male portion including projections/prongs 12, 14 and support 16 may be integrally molded (e.g., via injection molding) with the rest of the grill 5, or alternatively may be formed in any other suitable manner. In certain example embodiments, projections 12, 14 are made of substantially rigid polymer based material. In certain example embodiments, the grill (including projections/prongs 12, 14 and support 16) is made of or includes polycarbonate, ABS, or any other suitable material (s). In certain example embodiments, the GOR structure may be made of or include a thermoset material such as a glass filled sheet molding compound, or alternatively may be formed of metal or may be made of any other suitable polymer based material.

Figure 6:
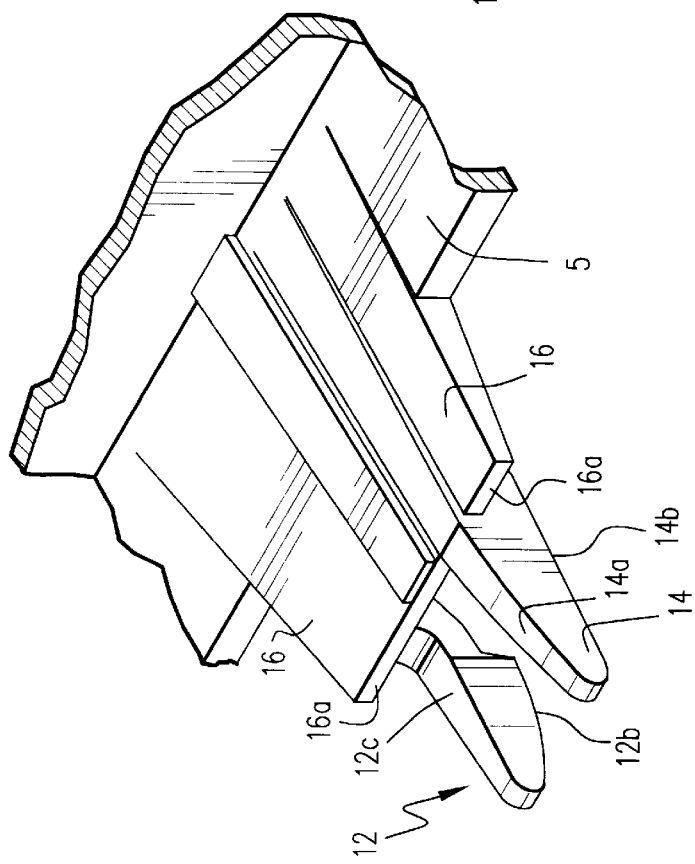
FIG. 6 is a close-up top/side perspective view of the connection structure portion of FIGS. 1–5 which is supported by the grill (i.e., the male portion).

FIG. 6 is a perspective view of the male attachment structure of FIG. 2, as viewed from the top thereof. FIGS. 2 and 6 illustrate the attachment structure from different perspectives (bottom and top) for ease of illustration, and to facilitate better understanding of this example embodiment of this invention. It can be seen that, in certain example embodiments of the invention, as viewed from above or below the two prongs/projections 12 and 14 extend from support 16 in substantially the same direction in a side-by-side manner (i.e., the same direction plus/minus twenty degrees). In certain example embodiments, as viewed from above or below, the prongs 12 and 14 are approximately parallel to one another (i.e., parallel plus/minus twenty degrees with respect to one another).

Figure 3A:
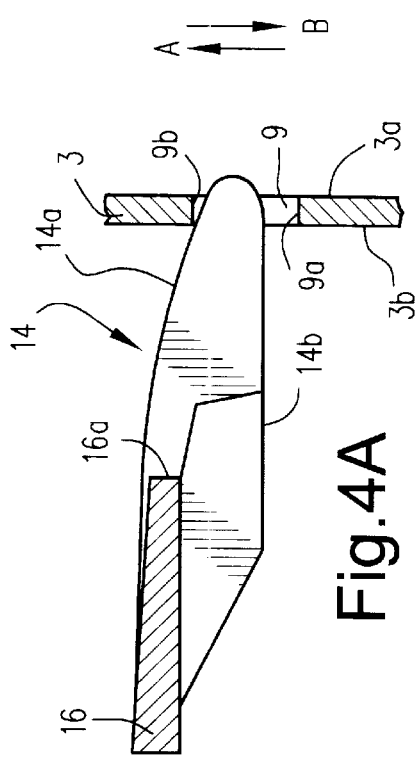
FIGS. 3A–3B are side cross sectional views of one of the prongs of the connection structure of FIG. 2 as it progressively slides into the connection opening/aperture.

Referring to FIGS. 2–5, the two projections/prongs 12 and 14 are differently shaped compared to one another, although they are inserted together into aperture 9 in order to make the connection/attachment. FIG. 2 shows an entire example attachment structure including both prongs 12, 14 and the aperture 9 into which they are inserted; whereas FIG. 3 illustrates prong 12 being progressively inserted into aperture 9 and FIG. 4 illustrates the other prong 14 being progressively inserted into the same aperture 9. FIGS. 5A and 5B are top views of the prongs 12, 14 being progressively inserted into the aperture 9. It is noted that FIG. 3 illustrates prong 12 in solid lines and prong 14 in dashed lines.

Figure 3B:
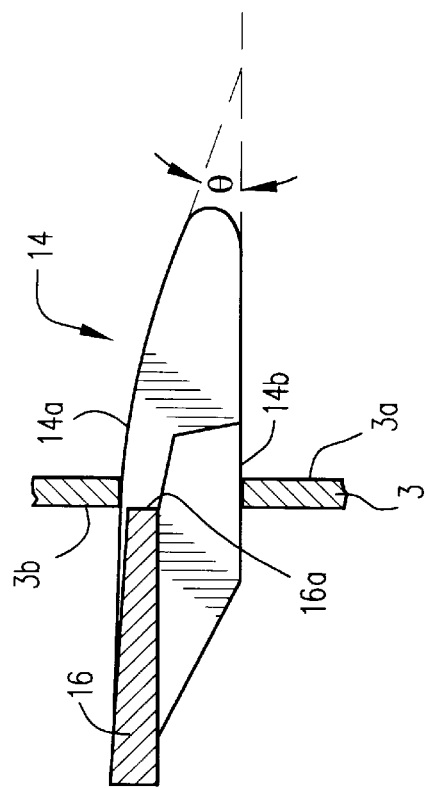
Figure 4A:
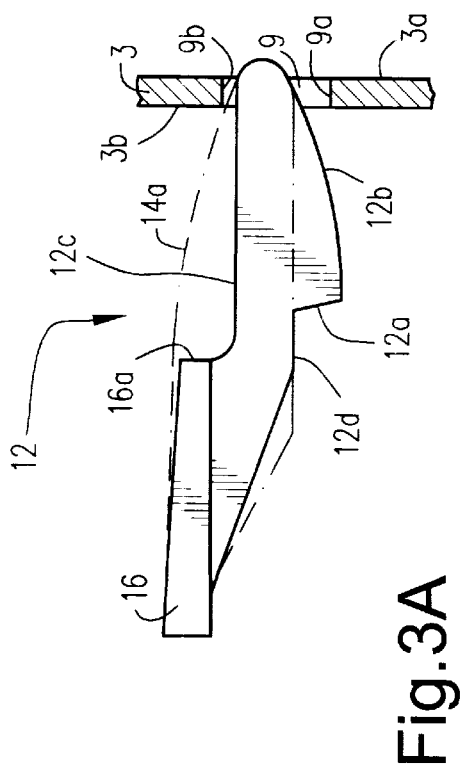
FIGS. 4A–4B are side cross sectional views of the other prong of the connection structure of FIG. 2 as it progressively slides into the connection opening/aperture.

First projection or prong 12 includes a latching step 12a defined therein which, after it slides through aperture 9, slides over and latches onto the wall 3a of the GOR structure 3 which at least partially defines aperture 9 in order to prevent the prong 12 (and thus the grill 5) from being pulled back out of the GOR structure 3 (e.g., see FIG. 3B). Prong 12 also includes an angled and/or curved bottom surface 12b which slides along the bottom edge 9a of opening 9 as the prong 12 is inserted into opening 9. After the prong 12 is fully inserted into opening 9, and latching step 12a has slid over and thus latched onto wall/surface 3a of the GOR structure, the angled and/or curved bottom surface 12b of prong 12 is no longer in contact with bottom edge 9a of the opening 9. Accordingly, it can be seen that prong 12 functions to attach the grill 5 to the vehicle (e.g., via GOR structure 3) and to prevent the grill 5 from being pulled away from (or off of) the vehicle. If one were to attempt to pull the grill 5 off of the vehicle (of away from the GOR structure 3), latching step 12a would prevent this because it would abut against wall 3a of the GOR structure 3 thereby preventing the prong 12 from being pulled out of the opening 9.

In contrast to first prong 12, the second prong 14 performs a different function and is thus shaped differently than prong 12 (even though both prongs 12 and 14 are mounted on support 16). For example, in certain example embodiments of this invention, prong 14 does not include the latching step that prong 12 has. Instead, prong 14 includes substantially smooth top surface 14a and bottom surface 14b which may abut or contact the edges of aperture 9 as prong 14 is slid or inserted into the aperture 9 along with prong 12. In particular, prong 14 is sized and shaped so that when prong 12 has been fully inserted into aperture 9 so that latching step 12a has slid over and latched onto wall 3, then prong 14 remains lodged in the aperture 9 with the top and/or bottom surfaces of the prong 14 abutting the edge(s) of aperture 9. Prong 14, lodged in the aperture 9 in such a manner, prevents prong 12 from becoming unlatched during vehicle operation because if the prong(s) were lifted upwardly top surface 14a of prong 14 would abut the top edge of the opening thereby preventing the first prong 12 from being further lifted thereby preventing prong 12 from becoming unlatched during vehicle operation.

Referring to FIGS. 2–5, the process of inserting prongs 12 and 14 simultaneously into aperture 9 will be described in accordance with an example embodiment of this invention. Prongs 12 and 14 extend approximately the same distance from the front stop wall 16a of support 16. The respective tips of the two prongs 12, 14 enter aperture 9 at approximately the same time during the insertion process (e.g., see FIGS. 3A, 4A and 5A), although they may enter at different times in alternative embodiments of this invention. As the prongs proceed into aperture 9, the top curved and angled surface 14a of prong 14 slides against and along the top edge 9b of the aperture 9 while the bottom curved and angled surface 12b of prong 12 slides against and along the bottom edge 9a of the aperture 9 (bottom surface 14b of prong 14 is not contacting bottom edge 9a of the aperture 9 and top surface 12c of prong 12 is not contacting the top edge 9b of the aperture 9 at this time near the beginning of the insertion process). Thus, prong 14 is being biased downwardly as curved and/or angled surface 14a thereof slides along top edge 9b of the aperture, while prong 12 is being biased upwardly as curved and/or angled bottom surface 12b thereof slides along bottom edge 9a of the aperture 9 during the insertion process (i.e., during insertion the two prongs 12 and 14 are biased in opposite directions, and one or both prongs may slightly flex in these respective directions as a result of the opposite biasing during the insertion process; prong 12 being biased in direction A and prong 14 being biased in direction B). The opposite biasing of the two prongs is caused because the top surface 14a of prong 14 is located above the top surface of prong 12 at the same lengthwise location in the aperture, and the bottom surface 12b of prong 12 is located below the bottom surface 14b of prong 14 at the same lengthwise location (e.g., see FIGS. 3A and 3B where prong 12 is shown in solid lines and prong 14 in dashed lines), and these sliding prong surfaces are curved/angled. As the insertion process proceeds, the biasing of prongs 12 and 14 in opposite directions A, B continues. As mention previously, even though both prongs are being biased in opposite directions from one another, this does not necessarily mean that both prongs flex accordingly. In certain embodiments of this invention, both prongs flex in the opposite directions in which they are biased; while in other embodiments only one of the prongs may flex even though both are being biased on opposite directions (e.g., when one prong is more flexible than the other, or when the biasing of one prong is stronger than the biasing of the other).

It can be seen that the prongs 12 and 14 being biased in opposite directions is in part caused by the fact that the one surface each prong is curved or angled while the opposite surface is approximately flat. For example, in the embodiment shown in FIGS. 1–6, prong 12 has a curved and angled bottom surface 12b for engaging a wall defining the aperture 9 and an approximately flat top surface 12c which need not engage any wall defining the aperture 9. Likewise, prong 14 has a curved and angled top surface 14a for engaging a wall defining the aperture 9 and an approximately flat bottom surface 14b which need not engage any wall defining the aperture 9 (although it may in certain embodiments). Because the curved/angled surfaces of the different prongs are provided on opposite sides of the respective prongs compared to one another, insertion of the prongs into the aperture 9 causes the prongs to be biased in opposite directions. In certain example embodiments of this invention, bottom surface 12b of prong 12 is angled θ from about 5–50 degrees, more preferably from about 15–35 degrees relative to top surface 12c of the prong. In a similar manner, in certain example embodiments top surface 14a of prong 14 is angled θ from about 5–50 degrees, more preferably from about 10–35 degrees relative to bottom surface 14b of the prong (see FIG. 4B). Optionally, in certain embodiments the bottom surface 14b of prong 14 will eventually abut and/or slide along the bottom aperture edge 9a as the insertion process continues.

Figure 5B:
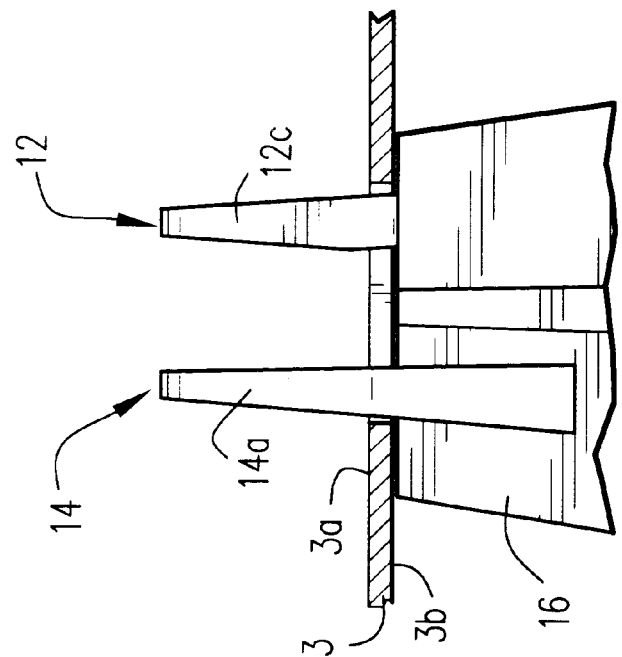
FIGS. 5A–5B are top plan views of the connection structure of FIGS. 2–4 as it progressively slides into the connection opening/aperture.
Figure 5A:
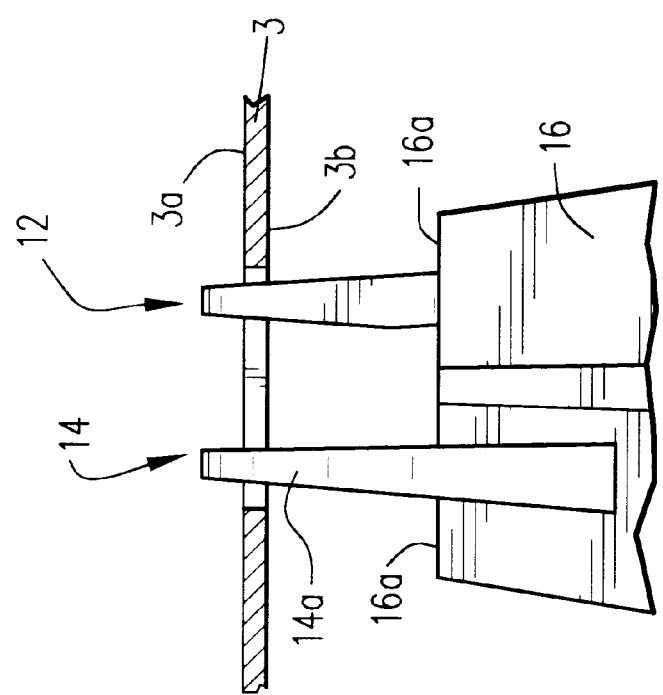

During the insertion process, once the latching step 12a of prong 12 gets beyond the rear surface 3a of the wall 3 of GOR structure 3, prong 12 springs downwardly in direction B until stopped by wall 12d of prong 12 abutting bottom aperture edge 9a so that step 12a latches over the wall 3 to prevent the prong from being pulled back out of the aperture 9 (see FIGS. 3B and 5B). This downward springing of prong 12 in direction B is caused by the bias on the other prong 14 caused in part by surface 14a sliding along top edge 9b of the aperture. When prong 12 is in the FIGS. 3B, 5B latch position and latching step 12a is preventing the prongs from being pulled out of the aperture 9, front edge 16a of support 16 acts as a stop for preventing the prongs 12, 14 from being pushed any or much further into aperture 9 (i.e., further forward movement into the aperture 9 is prevented as stop 16a abuts against front surface 3b of the GOR wall 3). Moreover, when prong 12 is in the FIGS. 3B, 5B position, the other prong 14 is provided in the aperture 9 such that top surface 14a abuts or is closely proximate to top edge 9b of the aperture 9 thereby securing the prongs in place and preventing latching step 12a from being lifted over bottom edge 9a of the aperture 9.

Figure 4B:
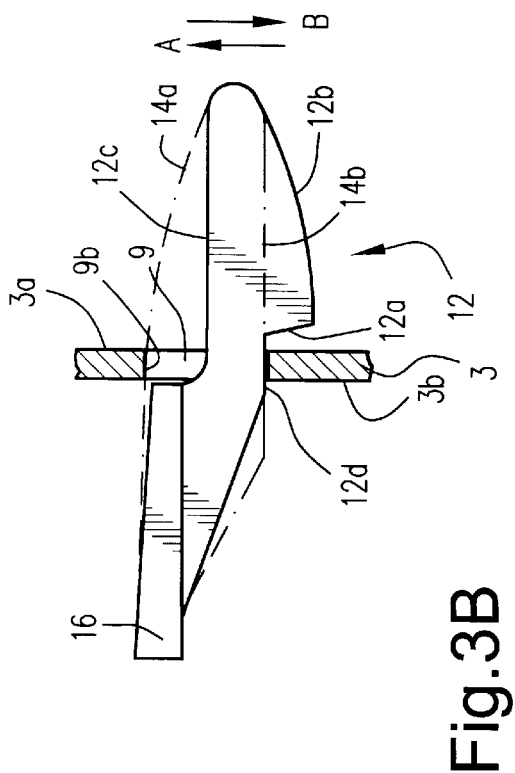

Thus, as shown in FIGS. 3B, 4B and 5B, after the prongs 12 and 14 have been inserted into aperture 9, prong 12 keeps the prongs and grill 5 from being pulled out of the aperture 9 due to the presence of latching step 12a, while prong 14 prevents the prongs 12, 14 from being lifted upwardly in the aperture 9 thereby preventing the other prong 12 from becoming unlatched. Because the prongs 12, 14 cannot be lifted upwardly in the aperture 9 (due to surface 14a of prong 14 abutting top edge 9b of the aperture 9), latching step 12a cannot be lifted above bottom edge 9a of the aperture 9 so that the prongs cannot be pulled out of the aperture. It can thus be seen that the differently shaped prongs 12 and 14 perform different functions so as to work together to keep the grill 5 attached to the GOR structure 3. Prong 12 keeps the grill 5 from being pulled out of aperture 9, while prong 14 keeps prong 12 from being moved upwardly so that step 12a remains over the bottom edge 9a of the aperture 9. In other words, prong 12 provides the latching/connecting function while the other prong 14 prevents prong 12 from being unlatched.

Figure 7:
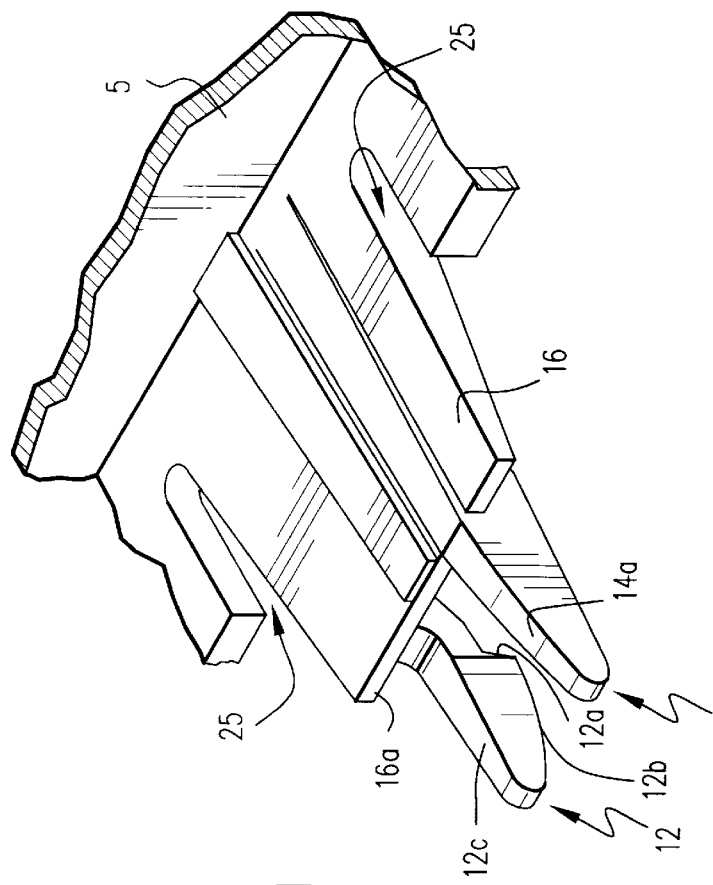
FIG. 7 is a close-up top/side perspective view of the connection structure of another example embodiment of this invention (male portion only).

FIG. 7 is a perspective view of a male attachment structure adapted to be inserted into an aperture 9 according to another embodiment of this invention (as viewed from the top thereof) in order to connect a trim component to a vehicle. The attachment or connection structure of FIG. 7 is similar to that of FIGS. 1–6, except that support 16 and prongs 12, 14 extend further from the main grill body, and cut-out areas 25 are provided on either side of support 16. The FIG. 7 attachment structure connects to the GOR structure 3 in the manner described above. Other similar shapes may also be utilized.

While the aforesaid connection system has been described primarily as being used to attached a front grill to a vehicle, the instant invention is not so limited. For example and without limitation, the connection system of this invention may also be used to attach other automotive trim components (e.g., bumpers, fascia, wheel covers, etc.) to vehicle(s). Moreover, the shapes illustrated in the drawings and described above are provided for purposes of example only and are not intended to be limiting. Other shapes and sizes may be used in other embodiments of this invention without departing from the overall spirit of the invention. Moreover, in certain alternative embodiments of this invention, the latching prong may latch onto the top wall of the aperture (instead of the bottom aperture wall as illustrated in the drawings), with the other prong preventing the latching prong from being significantly move downward to prevent unlatching. In still further alternative embodiments of the invention, the latching prong may latch onto one side wall of the aperture while the other prong abuts against the other side wall of the aperture in order to prevent the latching prong from being moved significantly laterally so as to prevent unlatching.

Moreover, in other embodiments of this invention additional latching prong(s) may be provided for latching onto the wall of the aperture. For example, in certain alternative embodiments of the invention, two latching prongs may be provided (instead of the single latching prong illustrated in the figures herein). The additional latching prong may be an additional latching prong 12, or alternatively may be the lodging prong 14 shown in the figures except that the lodging prong 14 may be modified so as to have a latching structure (e.g., hook or some structure similar to step 12a) for latching onto the opposite wall of the aperture (i.e., both prongs may perform latching functions in certain embodiments of the invention).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Connection structure for attaching a front grill to a vehicle via at least one aperture provided in the vehicle, comprising:

an integrally molded grill including at least one connection structure including first and second prongs extending from a support in a side-by-side manner;

the first and second prongs being shaped differently so that when the first and second prongs are inserted into the aperture the first and second prongs slide along opposite edges of the aperture and are biased in opposite directions;

the first prong including a latching step for latching onto a wall at least partially defining the aperture in order to prevent the first prong from being pulled out of the aperture; and when the first prong is latched onto the wall, the second prong is positioned at least partially in the aperture, without being latched onto any wall defining the aperture, in order to prevent the first prong from being unlatched so as to securely connect the grill to the vehicle.

2. The connection structure of claim 1, wherein the support comprises a stop for preventing the prongs from being further inserted into the aperture.

3. The connection structure of claim 1, wherein the first prong latches onto the wall at a bottom edge of the aperture via the latching step, and the second prong has no latching step and can abut a top edge of the aperture in order to prevent the prongs from moving significantly upwardly in order to prevent the first prong from being unlatched.

4. The connection structure of claim 1, wherein the first prong includes a curved or angled bottom surface which slides along a bottom edge of the aperture during insertion of the prongs into the aperture, and the second prong includes a curved or angled top surface which slides along a top edge of the aperture during insertion of the prongs into the aperture so that the prongs are biased in opposite directions during the insertion.

5. The connection structure of claim 4, wherein the first prong includes a top surface which is at least partially flat and does not abut the top edge of the aperture when the grill is connected to the vehicle.

6. The connection structure of claim 5, wherein the second prong has a bottom surface which is substantially flat.

7. The connection structure of claim 4, wherein at least a portion of the curved or angled bottom surface of the first prong is angled from about 5–50 degrees relative to a top surface portion of the first prong, and at least a portion of the curved or angled top surface of the second prong is angled from about 5–50 degrees relative to a bottom surface portion of the second prong.

8. Connection structure for attaching a front grill to a vehicle via at least one aperture provided in the vehicle, comprising:

an integrally molded grill including first and second side-by-side prongs;

the first and second prongs being shaped differently so that when the first and second prongs are inserted into the aperture respective curved or angled surfaces of the first and second prongs slide along opposite edges of the aperture;

the first prong including a latching step for latching onto a wall at least partially defining the aperture in order to prevent the first prong from being pulled out of the aperture; and when the first prong is latched onto the wall, the second prong is positioned at least partially in the aperture, without being latched onto any wall defining the aperture, in order to prevent the first prong from being unlatched so as to securely connect the grill to the vehicle.

9. The connection structure of claim 8, wherein when the first and second prongs are inserted into the aperture a curved or angled bottom surface of the first prong slides along a bottom edge of the aperture and a curved or angled top surface of the second prong slides along a top edge of the aperture, so that the first and second prongs are biased or forced in opposite directions during the insertion.

10. Connection structure for attaching a front grill to a vehicle via at least one aperture provided in the vehicle, comprising:

a grill including first and second prongs extending from a support;

means for causing the first and second prongs to slide along opposite edges of the aperture and be biased in opposite directions as the prongs are inserted into the aperture;

latching means for allowing the first prong to latch onto a wall at least partially defining the aperture;

means for causing, when the first prong is latched onto the wall, the second prong to become lodged in the aperture in at least one dimension so as to prevent the first prong from becoming unlatched thereby securely attaching the grill to the vehicle; and wherein the second prong is not latched onto any wall of the aperture.

11. The connection structure of claim 10, wherein the support includes stop means for preventing the prongs from being further inserted into the aperture.

12. Connection structure for attaching a trim component to a vehicle via at least one aperture, comprising:

the trim component being integrally molded so as to include first and second prongs extending from a support;

means for causing the first and second prongs to slide along opposite edges of the aperture as the prongs are inserted into the aperture;

latching means for allowing the first prong to latch onto a wall at least partially defining the aperture in order to prevent the first prong from being pulled out of the aperture;

means for causing, when the first prong is latched onto the wall, the second prong to become lodged in the aperture in at least one dimension so as to prevent the first prong from becoming unlatched thereby securely attaching the trim component to the vehicle.

13. The connection structure of claim 12, wherein when the first and second prongs are inserted into the aperture a curved or angled bottom surface of the first prong slides along a bottom edge of the aperture and a curved or angled top surface of the second prong slides along a top edge of the aperture, so that the first and second prongs are biased or forced in opposite directions during the insertion.

14. A method of attaching a grill to a vehicle, the method comprising:

injection molding a grill so as to include a grill body for allow air flow therethrough and first and second prongs extending in a side-by-side manner from a support;

inserting the first and second prongs into an aperture so that during the inserting the first and second prongs slide along opposite edges of the aperture and are biased or forced in opposite directions; and continuing the inserting until the first prong latches onto a wall at least partially defining the aperture and the second prong is positioned at least partially in the aperture, without latching, in a manner so as to prevent the first prong from becoming unlatched during operation of the vehicle.

15. The method of claim 14, wherein the inserting further comprises inserting the prongs into the aperture so that during the inserting a curved or angled bottom surface of the first prong slides along a bottom edge of the aperture and a curved or angled top surface of the second prong slides along a top edge of the aperture, so that the first and second prongs are biased or forced in opposite directions during the insertion.

16. The method of claim 15, wherein a latching step of the first prong for latching onto the wall is defined in the bottom surface of the first prong.

17. Connection structure for attaching a front grill to a vehicle via at least one aperture provided in the vehicle, comprising:

an integrally molded grill including at least one connection structure including at least first and second prongs extending from a support in a side-by-side manner;

the first and second prongs being shaped differently so that when the first and second prongs are inserted into the aperture the first and second prongs slide along opposite edges of the aperture and are biased in opposite directions;

the first prong including a latching step for latching onto a wall at least partially defining the aperture in order to prevent the first prong from being pulled out of the aperture; and when the first prong is latched onto the wall, the second prong is positioned at least partially in the aperture in order to prevent the first prong from being unlatched so as to securely connect the grill to the vehicle.

* * * * *